Aug. 19, 1924.
S. S. SHEARS
1,505,222
VEHICLE SPRING
Filed April 6, 1920
2 Sheets-Sheet 1
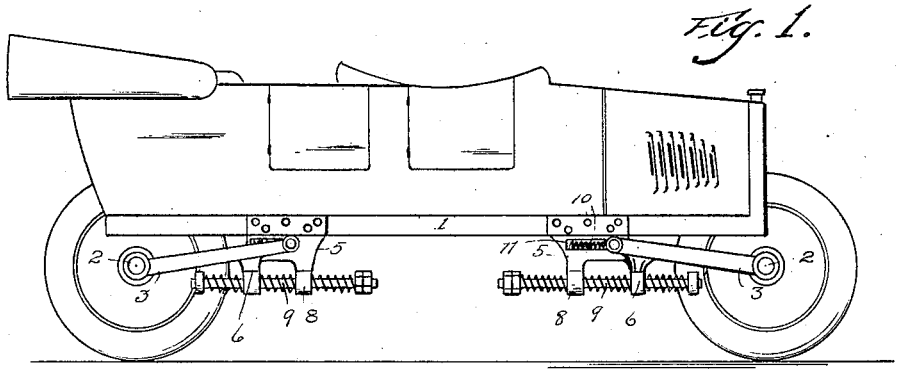
Fig. 1.
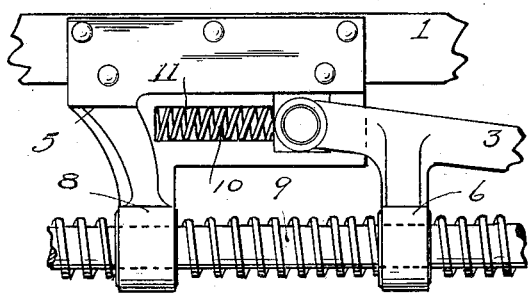
Fig. 2.
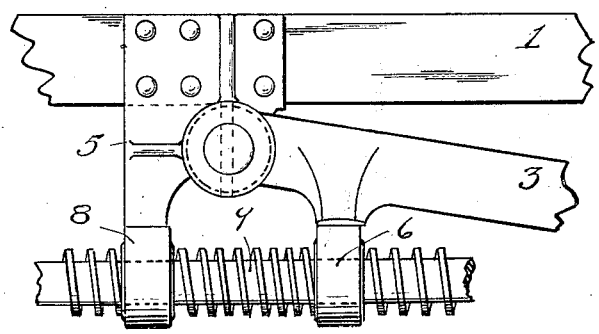
Fig. 3.
Sumner S. Shears, Inventor
By
Attorney

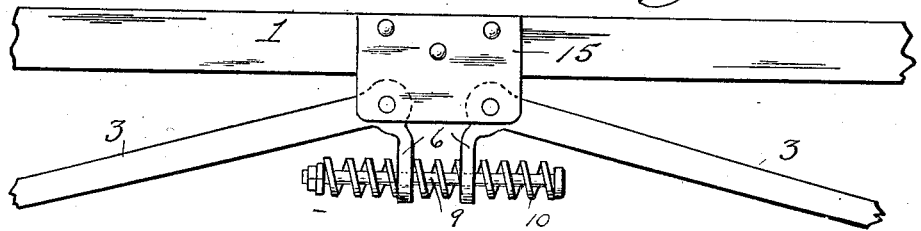
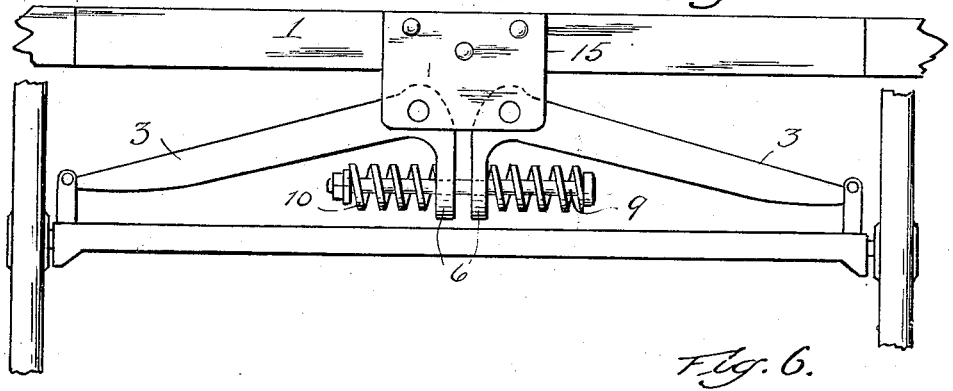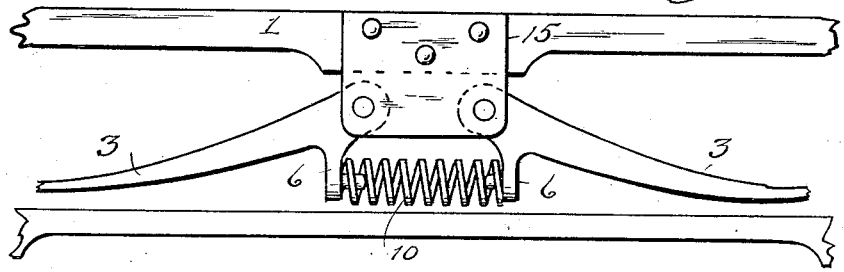

Patented Aug. 19, 1924.

1,505,222

UNITED STATES PATENT OFFICE.

SUMNER S. SHEARS, OF BROOKLYN, NEW YORK.

VEHICLE SPRING.

Application filed April 6, 1920. Serial No. 371,677.

*To all whom it may concern:*

Be it known that I, SUMNER S. SHEARS, a citizen of the United States, residing at Brooklyn, in the county of Kings and State of New York, have invented certain new and useful Improvements in Vehicle Springs, of which the following is a specification.

This invention relates to improvements in vehicle springs and it is intended more particularly for use in connection with motor driven vehicles.

The object in the present invention is to so mount the spring between the frame and the axles of such vehicles, that, in addition to the usual function performed by the springs, provision will be made for overcoming all vehicular strain.

The invention consists broadly in providing a set of levers, attached at one end, that is, the power end, to the axles while at the other end, namely the fulcrum end, they are attached to the frame, and provided with suitable resilient means at these fulcrum ends of the levers for controlling the oscillation of said levers.

The invention is more fully described in the following specification and clearly illustrated in the accompanying drawings, in which:—

Figure 1 represents a side elevational view of a vehicle with my invention shown thereon.

Figure 2 is a like side elevational view of the spring device and the inner end of the lever, enlarged.

Figure 3 is a slight modification of the device shown in Figure 2, with the buffer spring eliminated.

Figure 4 illustrates a modified form of my invention showing the front and rear levers attached to the same spring attachment, and Figures 5 and 6 show other modified forms of my invention.

In the drawings, the numeral 1 designates the frame of a vehicle and 2 the axles thereof. The numeral 3 designates the levers, of which there are four, one located at each corner of the vehicle and the outer end of each lever is attached to the axle while the inner ends are pivotally attached to the frame, either directly, or through the medium of a bracket or hanger, such as is illustrated by the numeral 5.

These levers 3, which may be termed bell-crank levers, may be made, if desired, in laminated form, and their inner ends may be formed with depending arms 6, as shown in Figures 1 to 3, or the inner ends of the levers may be curved or bent, as shown in Figures 4 to 6 with a pivotal point in relatively close proximity to the bent end, thus forming or providing the proper ratio, as between the power and the fulcrum ends of the levers, and it may be here stated that the essential feature of this present invention, is the application of this particular principle of leverage to the suspension of vehicle frames on their axles, and that while I have shown several practicable forms of providing the proper resiliency to the inner ends of the levers, this particular feature is admittedly not new in its broad sense.

In Figures 1 and 2 I have shown the inner ends of the levers provided with a spring device comprising a bracket 5 attached to the frame, having a depending arm 8, and a rod 9 passing through this arm and also the depending member 6 of the lever, and coiled springs located on this rod, one between the arms 8 and 6, and one on either end of the rod outside of the arms. These brackets are attached to the frame, one near each corner of the vehicle, and each bracket is shown as being provided with a buffer spring 10 housed in a pocket 11 formed in the bracket, and against which spring the inner end of the lever bears, so that this buffer spring will take care of a certain portion of the direct movement or jar transmitted to the frame from the levers.

The construction described will take care of all concussions such as are ordinarily met with and for which various springs and shock absorbers have been provided heretofore.

In Figure 3 I have shown the inner ends of the levers pivoted to the frames and provided with the depending arms and depending arms from the frame, and with the coiled springs between the arms and on either side of them, but with the buffer feature eliminated.

While this construction is simpler in form, it will, especially when proper provision is made, such for instance as a universal joint at one or the other end of the levers, provide sufficient protection against undue strain for all ordinary purposes.

In Figure 4 I have illustrated a simple form of my invention, showing a bracket 15 attached to the vehicle frame, and to this bracket the inner ends of both front and rear levers are pivotally attached. In this form, I have shown the inner ends of the levers bent to form the depending or fulcrum ends 6, and a rod 9 passing through these ends with a spring on the rod between the said ends 6 and a spring on either end of the rod outside of said ends.

In Figure 5 I have shown a construction in which the spring between the inner ends 6 of the levers is eliminated, and in which the action depends upon the two springs shown, one on either side of the pair of arms 6 which depend from their pivotal points and lie in close proximity to each other.

In Figure 6 I have shown a construction in which these depending arms 6 are spaced apart, and with a single spring located between them and by means of which both levers are actuated by the single spring.

It is, of course, evident that other forms of resilient members may easily be devised, such as cylinders containing oil or a combination of oil and springs, without departing from the spirit of the invention disclosed.

The outstanding feature of applicant's invention is the fact that the long radius of the lever movement, with the springs well back toward the fulcrum or weight end of the lever, will give that large leverage against the springs which permits extensive vertical movement of the free end of the lever with a very short travel on the springs, hence the shock, if any, is in a longitudinal direction, and the body movement, if any, is slow, irrespective of the speed of the spring action.

What I claim is:—

1. In vehicle springs, the combination with a vehicle frame, of levers carried at the end of the frame, buffers at the pivots of the levers, axles at the ends of the levers, brackets depending from the frame, arms depending from the levers, resilient means between the arms and the brackets to limit the swing of the levers and means for adjusting the resilient means.

2. In vehicle springs, the combination with a vehicle frame, of a lever near each corner of the frame, a buffer for the pivot of the lever, an axle at the free end of the lever, a bracket depending from the frame, an arm on the lever, a rod carried by the bracket and the arm and springs on the rod and adapted to be compressed by the movements of the arm.

3. In vehicle springs the combination with a vehicle frame, of a box near each corner of the frame and having a slot, a lever, a pivot at the end of the lever and secured in the slot, a spring buffer for the pivot, an arm depending from the frame, an arm on the lever, an axle at the outer end of the lever, a rod passing through perforations in the arms, a spring on the rod between the arms and springs on the outer ends of the rod.

4. In vehicle springs the combination with a vehicle frame, of slotted boxes at each corner of the frame, a lever having a lateral pivot extending into the slot, a buffer spring, an axle and a wheel at the free end of the lever, an arm on the lever, a bracket on the frame, a rod passing through perforations at the end of the bracket and arm, a coil spring on the rod and between the arm and bracket, springs at the outer ends of the rod, and retaining and adjusting nuts confining the springs.

5. The combination with a wheeled vehicle of a bracket fixedly mounted on the vehicle body having a depending arm, a member yieldingly fulcrumed on the bracket and having the vehicle axle mounted thereon, said fulcrumed member having a depending arm, a horizontally disposed member mounted on said depending arms, and springs mounted on said member engaging said arms and resiliently supporting the vehicle body, substantially as set forth.

In testimony whereof I affix my signature.

SUMNER S. SHEARS.